United States Patent
Klinetob et al.

(10) Patent No.: US 10,260,372 B2
(45) Date of Patent: Apr. 16, 2019

(54) VIBRATION DAMPING ASSEMBLY AND METHOD OF DAMPING VIBRATION IN A GAS TURBINE ENGINE

(71) Applicant: UNITED TECHNOLOGIES CORPORATION, Farmington, CT (US)

(72) Inventors: Carl Brian Klinetob, East Haddam, CT (US); William Richard Ganoe, Jr., Vernon, CT (US); Thomas B. Hyatt, Cromwell, CT (US); Jason Leroux, Kensington, CT (US); Douglas J. Morgan, Glastonbury, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 304 days.

(21) Appl. No.: 14/609,167

(22) Filed: Jan. 29, 2015

(65) Prior Publication Data
US 2016/0222821 A1 Aug. 4, 2016

(51) Int. Cl.
*F01D 5/16* (2006.01)
*F01D 25/04* (2006.01)
(Continued)

(52) U.S. Cl.
CPC .............. *F01D 25/04* (2013.01); *F01D 5/16* (2013.01); *F01D 9/041* (2013.01); *F01D 25/24* (2013.01); *F02K 3/06* (2013.01); *F04D 29/023* (2013.01); *F04D 29/542* (2013.01); *F04D 29/668* (2013.01); *F05D 2220/32* (2013.01);
(Continued)

(58) Field of Classification Search
CPC . F01D 25/04; F01D 5/16; F01D 9/041; F01D 25/24; F05D 2220/32; F05D 2230/60; F05D 2240/12; F05D 2260/96; F05D 2300/507; F04D 29/023; F04D 29/542; F04D 29/668; F02K 3/06; Y02T 50/672
See application file for complete search history.

(56) References Cited

U.S. PATENT DOCUMENTS

| 5,947,688 A * | 9/1999 | Schilling .................. F01D 5/147 416/233 |
| 6,039,542 A * | 3/2000 | Schilling ................... F01D 5/16 416/224 |

(Continued)

FOREIGN PATENT DOCUMENTS

| EP | 2907973 A2 | 8/2015 |
| FR | 2559422 A1 | 8/1985 |

(Continued)

OTHER PUBLICATIONS

European Search Report for Application No. 16153492.0-1610; dated Jun. 3, 2016.

(Continued)

*Primary Examiner* — Jessica Cahill
(74) *Attorney, Agent, or Firm* — Cantor Colburn LLP

(57) ABSTRACT

A vibration damping assembly and a method of damping vibration in a gas turbine engine are disclosed. The vibration damping assembly includes a strut configured to couple a fan case and turbine engine case of a turbine engine, a strut cavity disposed within the strut, and vibration damping media disposed in the strut cavity.

15 Claims, 5 Drawing Sheets

(51) Int. Cl.
 *F01D 25/24* (2006.01)
 *F02K 3/06* (2006.01)
 *F04D 29/66* (2006.01)
 *F01D 9/04* (2006.01)
 *F04D 29/02* (2006.01)
 *F04D 29/54* (2006.01)

(52) U.S. Cl.
 CPC ...... *F05D 2230/60* (2013.01); *F05D 2240/12* (2013.01); *F05D 2260/96* (2013.01); *F05D 2300/507* (2013.01); *Y02T 50/672* (2013.01)

(56) References Cited

U.S. PATENT DOCUMENTS

| | | | |
|---|---|---|---|
| 6,547,049 B1 | 4/2003 | Tomlinson | |
| 6,551,057 B1* | 4/2003 | Haaser | F01D 17/162 |
| | | | 415/119 |
| 6,669,447 B2 | 12/2003 | Norris et al. | |
| 2013/0058785 A1* | 3/2013 | Kellerer | F01D 5/16 |
| | | | 416/1 |
| 2013/0064676 A1* | 3/2013 | Salisbury | F01D 5/147 |
| | | | 416/229 R |
| 2013/0195652 A1* | 8/2013 | Pope | F01D 5/141 |
| | | | 416/1 |
| 2014/0086737 A1* | 3/2014 | Hyatt | F01D 5/147 |
| | | | 415/208.1 |
| 2015/0233264 A1* | 8/2015 | Hyatt | F01D 25/04 |
| | | | 415/119 |
| 2016/0333710 A1* | 11/2016 | Klinetob | F01D 25/06 |

FOREIGN PATENT DOCUMENTS

| | | | | |
|---|---|---|---|---|
| GB | 2235733 A | | 3/1991 | |
| GB | 2403987 A | * | 1/2005 | ............ F01D 5/147 |
| WO | 2014143874 A1 | | 9/2014 | |

OTHER PUBLICATIONS

English Translation to Abstract FR2559422, (retrieved Sep. 7, 2016).

EP Office Action Application No. 16 153 492.0 dated Nov. 26, 2018.

\* cited by examiner

VIBRATION DAMPING ASSEMBLY AND METHOD OF DAMPING VIBRATION IN A GAS TURBINE ENGINE

TECHNICAL FIELD OF THE DISCLOSED EMBODIMENTS

The present disclosure is generally related to turbine engines, in particular to a vibration damping assembly and a method of damping vibration in a gas turbine engine.

BACKGROUND OF THE DISCLOSED EMBODIMENTS

Gas turbine engines often include struts or structural guide vanes (SGVs) located axially aft of the fan of the gas turbine engine to support the fan case. Other struts or SGVs may be located in the compressor stages, the turbine stages, or other areas of the engine. In some airframe structures with engine mounts on the fan case, SGVs support the entire front portion of the engine. An SGV is typically structured as an airfoil to control and guide the flow of bypass air after the air passes the fan blades. SGVs may become dynamically excited by the bypass air, such as fan blade wakes creating vibrational responses in the SGVs. A thicker airfoil may be utilized for the SGVs in order to reduce the vibrational response and deflections of the SGVs. However, a thicker SGV airfoil is less efficient and increases the weight of the aircraft engine.

Therefore, a need exists in the art for a lightweight and efficient SGV.

SUMMARY OF THE DISCLOSED EMBODIMENTS

In one aspect, a vibration damping assembly for a gas turbine engine is disclosed. The vibration damping assembly includes a strut configured to couple a fan case and a turbine engine case of a turbine engine, a strut cavity disposed within the strut, and vibration damping media disposed in the strut cavity. In one embodiment, the vibration damping assembly further includes a strut cover defining an outer surface of the strut. In one embodiment, the strut is an airfoil. In one embodiment, the strut cavity includes a strut cavity surface with a surface layer disposed on the strut cavity surface. In one embodiment, the vibration damping media includes stainless steel shot.

In one aspect, a gas turbine engine assembly is disclosed. The gas turbine engine assembly includes a fan case encircling an axis, a turbine engine case encircling the axis and radially disposed between the fan case and the axis, a strut disposed between the fan case and the turbine engine case, wherein the strut includes a strut cavity, and vibration damping media disposed in the strut cavity. In one embodiment, the gas turbine engine assembly further includes a strut cover defining an outer surface of the strut. In one embodiment, the strut is an airfoil. In one embodiment, the strut cavity includes a strut cavity surface with a surface layer disposed on the strut cavity surface. In one embodiment, the gas turbine engine assembly further includes a plurality of struts circumferentially spaced between the fan case and the turbine engine case, wherein each of the plurality of struts includes a strut cavity. In one embodiment, the vibration damping media includes stainless steel shot.

In one aspect, a method of damping vibration in a gas turbine engine is disclosed. The method includes supporting a fan case of the gas turbine engine with a strut, wherein the strut includes a strut cavity, inserting vibration damping media in the strut cavity, and covering the strut cavity with an outer cover such that the vibration damping media is contained in the strut cavity. In one embodiment, the method further includes providing an opening in an inner cover to access the strut cavity. In one embodiment, covering the strut cavity with an outer cover includes covering the opening with an outer cover. In one embodiment, the method further includes securing the vibration damping media in the strut cavity with a magnetic field. In one embodiment, the strut is an airfoil. In one embodiment, the method further includes providing a strut cavity layer on a strut cavity surface. In one embodiment, the vibration damping media includes stainless steel shot. In one embodiment, the method further includes supporting the fan case of the gas turbine engine with a plurality of circumferentially spaced struts, wherein each of the plurality of struts includes a strut cavity.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
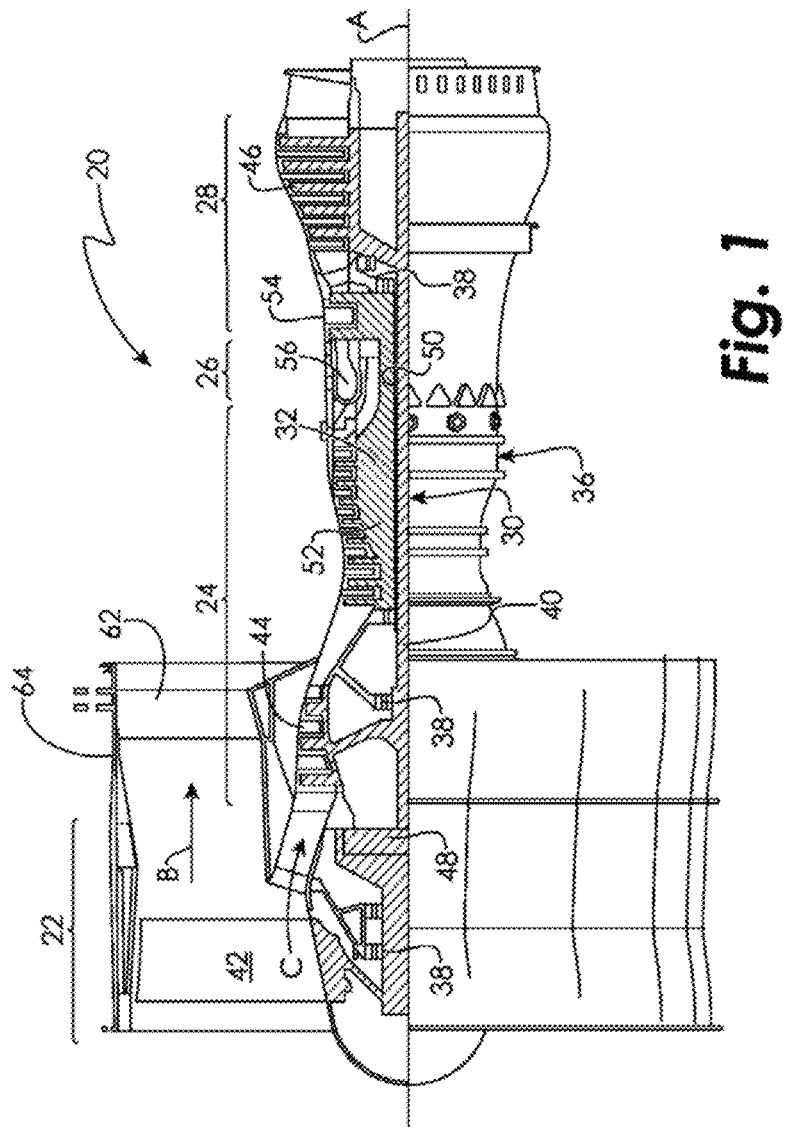
FIG. 1 is a sectional view of one example of a gas turbine engine in which the presently disclosed embodiments may be used.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \ ° \ R)/(518.7° \ R)]^{0.5}$. The "Low corrected fan tip speed" as disclosed herein according to one non-limiting embodiment is less than about 1150 ft/second (350.5 m/sec).

Figure 2:
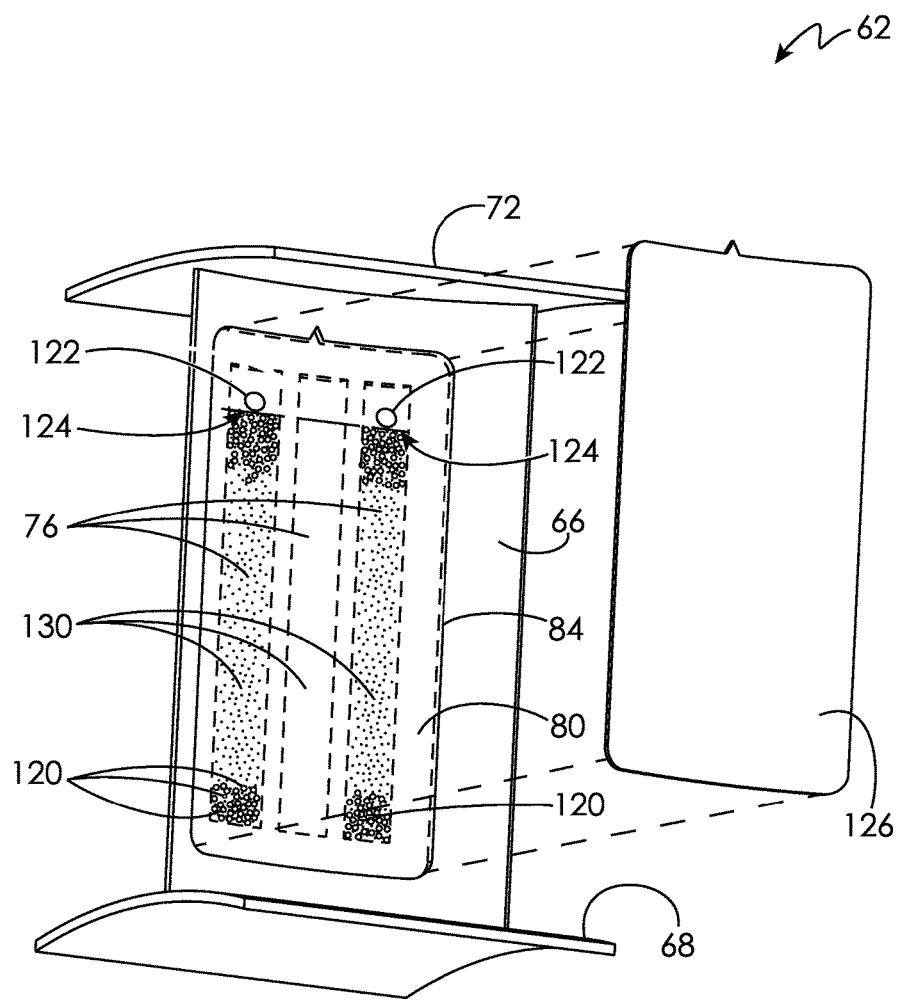
FIG. 2 is an semi-exploded view of a vibration damping assembly used in a gas turbine engine in one embodiment.

Referring now to FIG. 2 with continuing reference to FIG. 1, at a position aft the fan 42, the engine 20 includes a vibration damping assembly forming the structure of a strut 62. In one or more embodiments, the strut 62 is a structural guide vane (SGV) 62 constructed as an airfoil. The SGV 62 is configured to control or steer bypass airflow from the fan 42. The strut 62 in one or more embodiments supports the fan case 64 and/or other components of the engine 20 near the fan 42. According to an embodiment, the strut 62 is located within an array of struts circumferentially spaced or distributed about the axis A.

In the embodiment shown in FIG. 2, the strut 62 includes a vane body 66 extending from a radially inner platform 68 to a radially outer platform 72. In an installed position within the engine 20, the radially inner platform 68 mounts to an inner hub of the engine 20. The radially outer platform 72 mounts to the fan case 64 of the engine 20.

Figure 3:
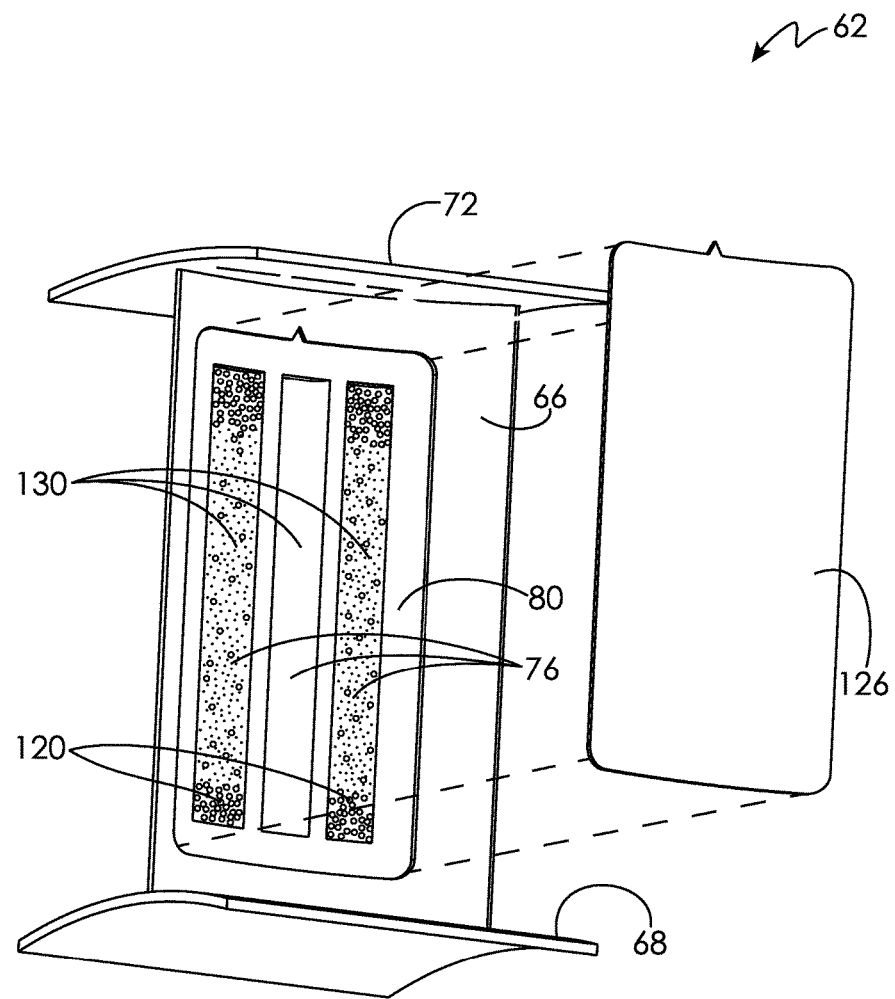
FIG. 3 is an exploded view of a vibration damping assembly used in a gas turbine engine in one embodiment.
Figure 4:
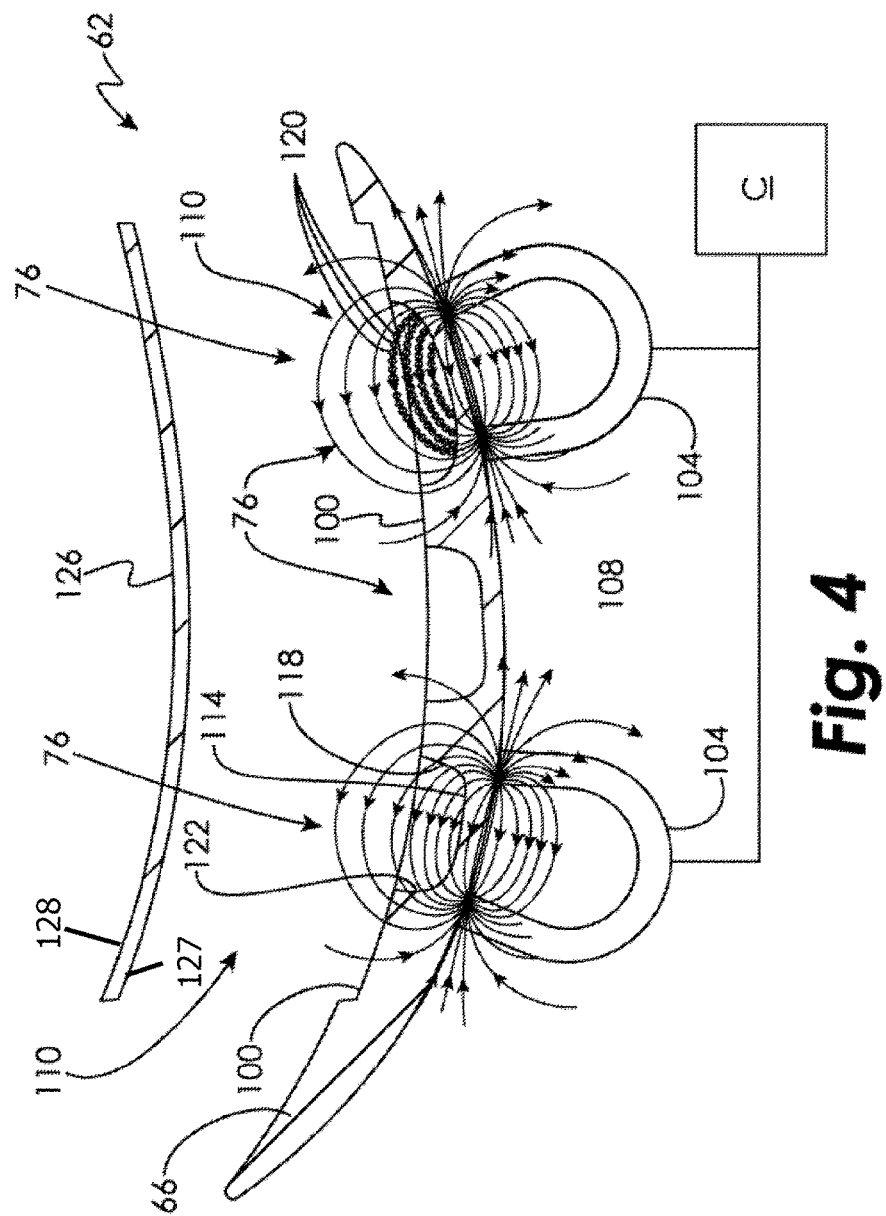
FIG. 4 is a cross sectional view of a vibration damping assembly during assembly in one embodiment.

The vane body 66 of one or more embodiments includes one or more cavities 76. The embodiment shown in FIG. 2 includes a vane body 66 having three cavities 76 that are approximately rectangular in shape. In one or more embodiments, the number and location of the cavities 76 may vary depending on the application. Although the embodiments of FIGS. 2-4 illustrate two of three outer cavities 76 being filled with vibration damping media 120, vibration damping media 120 may fill or be absent from any of the cavities 76 of the vane body 66. In the embodiment of FIG. 2, one or more cavities 76 are formed on the pressure side of the strut 62. However, in other embodiments, one or more cavities 76 may be formed on the suction side of the strut 62 instead of or in addition to the pressure side of the strut 62. One or more cavities 76 may be formed in the radially inner platform 68 or radially outer platform 72 in further embodiments of the present disclosure.

As shown in FIG. 2, the one or more cavities 76 are formed within a recessed area 80 of the vane body 66. In one embodiment of the present disclosure, the recessed area 80 receives a vane cover 84 when the strut 62 is assembled. The vane cover 84 is secured to the recessed area 80 by one or more fastening methods or structures including as non-limiting examples bonding, welding, adhesion, or mechanical attachment. One of ordinary skill in the art will recognize the various ways to couple gas turbine engine components that may be utilized to assemble the strut 62, and such methods and structures are included in the present disclosure.

In the embodiment of FIG. 2, an opening 122 is formed in the vane cover 84 adjacent two of the three cavities 76 to access each of those cavities 76. However, in additional embodiments, an opening 122 is formed adjacent any cavity 76 configured to be filled with vibration damping media 120. The opening 122 of an embodiment is formed by drilling through the vane cover 84. In another embodiment, the vane cover 84 may be formed with the openings 122 already present. The hole or opening 122 allows the cavity 76 to be filled at least partially full with vibration damping media 120. Each opening 122 is positioned in the vane cover 84 of the embodiment of FIG. 2 such that vibration damping media 120 fills the cavity 76 up to a predetermined fill level 124 near the opening 122. In the embodiment shown in FIG. 2, the fill level 124 is between 93% and 94% of the volume of the cavity 76. In additional embodiments, the fill level 124 is between 90% and 97%, depending on the geometry of the strut 62 and/or the cavity 76 and/or performance requirements of the engine 20.

In the embodiment of FIG. 2, the vibration damping media 120 is not held within any container within the one or more cavities 76. The vibration damping media 120 of FIG. 2 is in direct contact with the vane body 66 and the vane cover 84. In one or more embodiments, the cavity 76 and/or an interior surface of the vane cover 84 adjacent the cavity 76 is coated or plated with a layer or coating 130 of material to increase durability and/or reduce erosion. Such coating or layer 130 may utilize, as non-limiting examples, electroplating, cathodic arc deposition, or hard anodizing, and may include, as non-limiting examples, nickel, cobalt chromium alloys, polyurethane or other polymers, or a variety of other metals, ceramics, polymers, or composites. One of ordinary skill in the art will recognize many methods and materials that may be utilized to increase durability and/or reduce erosion of a vane surface, and such methods and materials are included in the present disclosure.

The vibration damping media 120 of the embodiment shown in FIG. 2 for placement within the cavities 76 is stainless steel shot. In one or more embodiments, the vibration damping media 120 includes, as non-limiting examples, sand, damping tape, ceramic particles, and/or bearing balls. In an embodiment, the vibration damping media 120 includes stainless steel shot having a diameter of 0.035". In other embodiments, the vibration damping media 120 includes shot having a diameter in the range of 0.015" and 0.055". In one or more embodiments, the shot of the vibration damping media 120 are cold formed and are magnetic. The stainless steel shot of one embodiment of the vibration damping media 120 are not intrinsically ferromagnetic. However, by virtue of being subject to high amounts of cold work in the particular embodiment, sufficient grain alignment is achieved to behave like a ferromagnetic material. As will be explained in further detail below, the vibration damping media 120 of one embodiment may be positioned within a magnetic field for containment within one or more cavities 76.

Referring again to FIG. 2, after the one or more cavities 76 are filled to the fill level 124 with vibration damping media 120, an outer cover 126 is assembled over the one or more openings 122. In the embodiment of FIG. 2, the outer cover 126 is substantially the same size and shape as the vane cover 84. However, the outer cover 126 of other embodiments is smaller than the vane cover 84 while being sufficiently sized to cover the one or more openings 122. In still other embodiments, the outer cover 126 is larger than the vane cover 84. In an embodiment, the outer cover 126 is assembled onto the strut 62 using the same method that the vane cover 84 is secured to the recessed area 80.

Referring now to the embodiment of FIGS. 3 and 4, the vibration damping media 120 is magnetic and is secured in the one or more cavities 76 without the vane cover 84. As shown in FIG. 3, one or more magnetic fields are utilized in the embodiment of FIGS. 3 and 4 to hold the vibration damping media 120 within the one or more cavities 76 before the outer cover 126 is assembled over the cavities 76. In an embodiment, the outer cover 126 is secured to the recessed area 80 after the cavities 76 are sufficiently filled with vibration damping media 120. In one or more embodiments, an interior surface 127 of the outer cover 126 is coated or plated with a layer of material to increase durability and/or reduce erosion in the same manner described above with regard to coating or plating the interior surface of the vane cover 84. The interior surface 127 of the outer cover 126 may directly engage the vibration damping media 120 that is disposed with the one or more cavities 76. An outer surface 128 of the outer cover 126 that is disposed opposite the interior surface 127 is disposed substantially flush or substantially coplanar and parallel with an exterior surface of the vane body 66 that may be exposed to the flow path.

In the embodiment shown in FIG. 4, magnets 104 are used to hold the magnetic vibration damping media 120 within the one or more cavities 76 before the outer cover 126 is secured. The magnetic shot of the vibration damping media 120 of the embodiment shown in FIG. 4 tends to align in arcing strands along magnetic field lines, which facilitates holding the vibration damping media 120 within the cavities 76. When the vibration damping media 120 are loaded into the cavities 76, magnets 104 of an embodiment are positioned along a surface 108 of the vane body opposite the cavities 76. In an embodiment, the magnets 104 are electromagnets that selectively induce magnetic fields 110 in response to a command from a controller C. In an embodiment, the magnets 104 are held within a fixture (not shown) that supports the vane body 66.

The magnets 104 of the embodiment shown in FIG. 4 are aligned such that the magnetic fields 110 that enter the cavities 76 through a side of the floor 114 of the cavity 76 extend continuously to exit the cavity 76 through another side of the floor 114. The magnetic fields 110 that enter the cavity 76 through a side wall 118 of the cavity 76 extend continuously to exit the cavity 76 through the opposing side wall 122. The magnetic force from the magnets 104 pulls the vibration damping media 120 into the cavities 76. The orientation of the flow fields 110 encourages orientation of vibration damping the vibration damping media 120 in strands within the cavities 76 along the magnetic fields 110. Alignment along the flow fields 110 helps to ensure that the vibration damping media 120 do not extend out of the cavities 76 to interfere with a bond line 100 between the outer cover 126 and the vane body 64. To encourage the magnetic fields 110 to align in this way, the magnets 104 have a first pole adjacent the side wall 118 and an opposing, second pole adjacent the side wall 122.

With vibration damping media 120 not interfering with the bond line 100, the outer cover 126 can then be secured to the strut 62. In an embodiment, the outer cover 126 is secured within the recessed area 80 to the vane body 66 to hold the vibration damping media 120 within the cavities 76. The magnets 104 are removed or demagnetized after the outer cover 126 is secured. The vibration damping media 120 are then held within the cavities 76 by the outer cover 126. The vibration damping media 120 directly contact the outer cover 126, the floor 114, and the side walls 118, 122. The vibration damping media 120 are free to move within the cavities 76 without interference from any separate container.

Vibration damping of the strut 62 can be influenced by the amount of vibration damping media 120 within the cavities 76. Notably, the methods of the present disclosure enable filling the cavities 76 with the vibration damping media 120 without requiring a separate container within the cavities 76 holding the vibration damping media 120. This maximizes damping area within a given area of the cavities 76. If containers were required, the container would occupy at least some of the space of the cavities 76.

Figure 5:
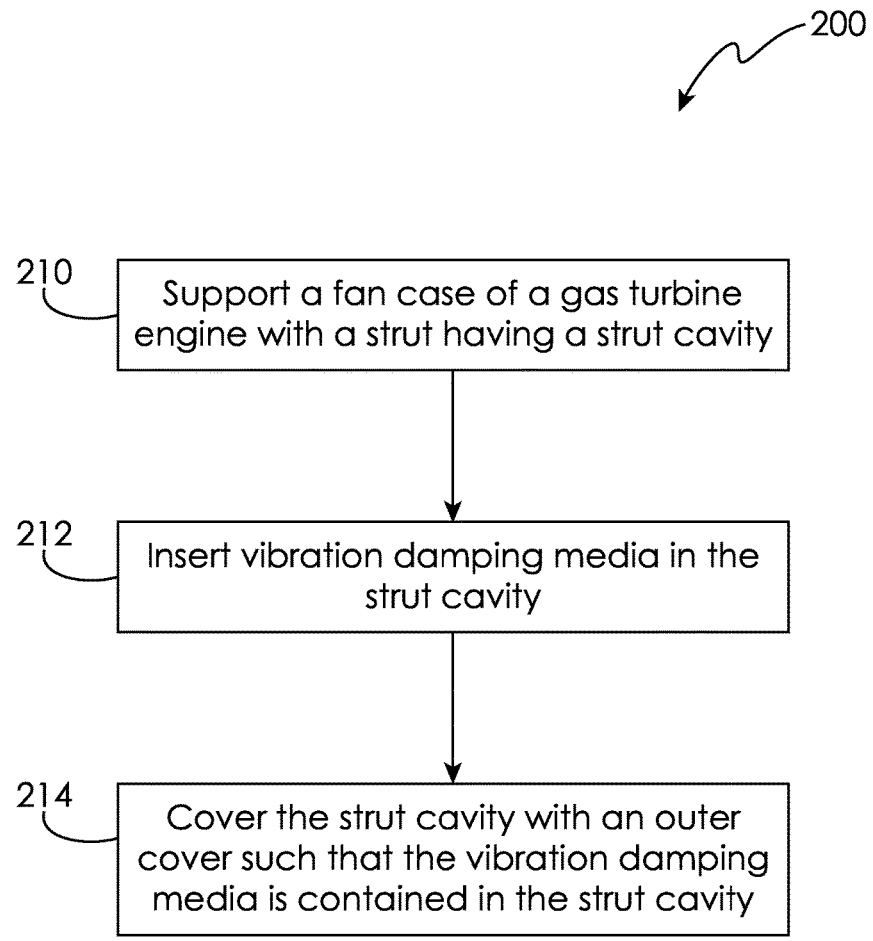
FIG. 5 is a schematic flow diagram of an embodiment of a method of damping vibration in a gas turbine engine in one embodiment.

Referring now to FIG. 5, a method 200 of damping vibration in a gas turbine engine is disclosed. The method includes supporting, at step 210, the fan case 64 of the gas turbine engine 20 with the strut 62. The strut 62 includes one or more strut cavities 76. The method further includes inserting, at step 212, the vibration damping media 120 in the one or more strut cavities 76. The method further includes covering, at step 214, the one or more strut cavities 76 with the outer cover 126 such that the vibration damping media 120 is contained in the one or more strut cavities 76.

In an embodiment, the method 200 further includes providing the one or more openings 122 in the vane cover 84 as an inner cover to access the one or more strut cavities 76. In an embodiment, covering the one or more strut cavities 76 at step 214 includes covering the one or more openings 122 with the outer cover 126. The method 200 of an embodiment further includes securing the vibration damping media 120 in the one or more strut cavities 76 with the one or more magnetic fields 110.

According to one or more embodiments, the method 200 further includes providing the strut cavity layer 130 on a surface of the one or more strut cavities 76. The method 200 of an embodiment further includes supporting the fan case 64 of the gas turbine engine 20 with a plurality of circumferentially spaced struts 62, wherein each of the plurality of struts includes the one or more strut cavities 76.

In addition to the selection and placement of the vibration damping media 120, various types of materials may be utilized to form the vane body 64, the vane cover 84, and the outer cover 126. In an embodiment, these components are formed of the same material, such non-limiting examples being aluminum or organic matrix composite. In one or more embodiments, the vane body 64, the vane cover 84, and the outer cover 126 are formed of different materials to vary performance parameters of the strut 62, including such non-limiting examples as weight, stiffness, or both. The vibration damping assembly and methods described in the present disclosure refer to the strut 62. In one or more embodiments, similar techniques of magnetic retention of vibration damping media are be used in connection with other components, such non-limiting examples including other vanes, blades, and airfoil components of the engine 20, as shown in FIG. 1.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. A structural guide vane for a gas turbine engine comprising:
a vane body having a recessed area provided with a strut cavity;
vibration damping media disposed in the strut cavity, the vibration damping media is magnetic; and
an outer cover secured directly to the recessed area, the outer cover having an interior surface that engages the vibration damping media and an outer surface that is disposed substantially flush with an exterior surface of the vane body.

2. The structural guide vane of claim 1, wherein the strut cavity includes a strut cavity surface with a surface layer disposed on the strut cavity surface.

3. The structural guide vane of claim 1, wherein the vibration damping media comprises stainless steel shot.

4. A gas turbine engine assembly comprising:
a fan case encircling an axis;
a turbine engine case encircling the axis and radially disposed between the fan case and the axis;
strut disposed between the fan case and the turbine engine case, wherein the strut includes a vane body defining a recessed area, and a strut cavity formed within the recessed area;
vibration damping media disposed in the strut cavity; and
an outer cover secured directly to the recessed area to secure the vibration damping media in the strut cavity, the outer cover having an interior surface that directly engages the vibration damping media and an outer surface that is disposed substantially flush with an exterior surface of the vane body.

5. The assembly of claim 4, wherein the strut is an airfoil.

6. The assembly of claim 4, wherein the strut cavity includes a strut cavity surface with a surface layer disposed on the strut cavity surface.

7. The assembly of claim 4, further comprising a plurality of struts circumferentially spaced between the fan case and the turbine engine case, wherein each of the plurality of struts includes a strut cavity.

8. The assembly of claim 4, wherein the vibration damping media comprises stainless steel shot.

9. A method of manufacturing a structural guide vane for a gas turbine engine, the method comprising:
providing a strut that includes a vane body having a strut cavity formed within a recessed area of the vane body;
filling the strut cavity with a vibration damping media up to a predetermined fill level;
positioning the vibration damping media within a magnetic field to hold the vibration damping media within the strut cavity; and
securing an outer cover to the recessed area to hold the vibration damping media within the strut cavity, the outer cover having an interior surface that directly engages the vibration damping media and an outer surface that is disposed substantially flush with an exterior surface of the vane body.

10. The method of claim 9, further comprising providing a strut cavity layer on a strut cavity surface.

11. The method of claim 9, wherein the vibration damping media comprises stainless steel shot.

12. The method of claim 9, further comprising supporting a fan case of the gas turbine engine with a plurality of circumferentially spaced struts, wherein each of the plurality of struts includes a strut cavity.

13. A method of manufacturing a structural guide vane for a gas turbine engine, the method comprising:
providing a strut that includes a vane body having a strut cavity formed within a recessed area of the vane body;
providing a vane cover having an opening formed therein;
receiving the vane cover within the recessed area;
filling the strut cavity through the opening with a vibration damping media up to a predetermined fill level;

holding the vibration damping media in the strut cavity with a magnetic field, without the vane cover; and securing an outer cover to the recessed area to secure the damping media in the strut cavity, without the vane cover.

14. The method of claim 13, further comprising coating an interior surface of the outer cover with a coating of material to at least one of increase durability and decrease erosion.

15. The method of claim 13, wherein an exterior surface of the outer cover is disposed substantially flush with an exterior surface of the vane body.

* * * * *